Patented Nov. 10, 1936

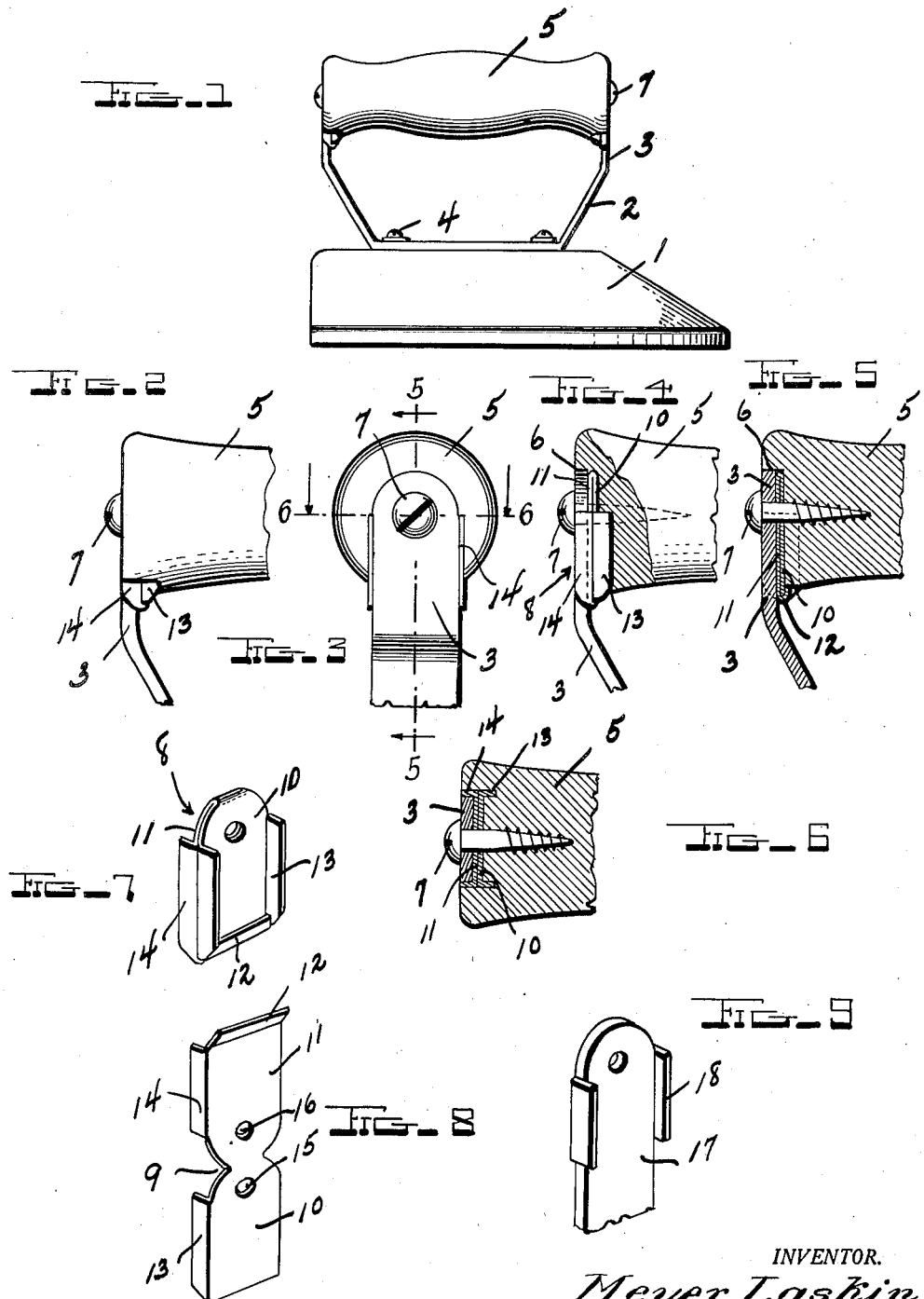

2,060,225

UNITED STATES PATENT OFFICE 2,060,225

ATTACHMENT FOR SADIRON HANDLES

Meyer Laskin, Baltimore, Md.

Application May 13, 1936, Serial No. 79,568

7 Claims. (Cl. 38—90)

The present invention relates to improvements in sadirons and has reference more particularly to an attachment for the handle thereof.

It has been experienced that with the conventional wooden handle now generally in use upon sadirons, that the handle has a tendency to turn and as a result thereof, the ends of the wooden handle become broken off, thereby necessitating the replacement of the broken handle with a new one and often resulting in discarding the sadiron and requiring replacement with a new one.

It is, therefore, one of the important objects of my invention to provide an attachment for association with the wooden handle and the upper ends of the arms connected to the handle for reinforcing the handle and at the same time preventing rotation of the handle between the supporting arms.

A further and important object is to provide an attachment of the above mentioned character which can be readily and easily inserted in position in the recessed ends of the wooden handle without requiring any alteration of the parts with which the attachment is adapted to cooperate.

A still further object is to provide an attachment for sadiron handles which is simple in construction, inexpensive, strong and durable, and further well adapted for the purposes for which it is designed.

Other objects and advantages of the present invention will become apparent from the following description when taken in connection with the accompanying drawing:

In the drawing, forming a part of this specification, and in which like numerals designate corresponding parts throughout the several views:

Figure 1 is a side elevation of a sadiron showing my attachment in place at the respective ends of the wooden handle;

Figure 2 is an enlarged fragmentary detail of one end portion of the handle and its corresponding supporting arm showing a portion of the attachment in place;

Figure 3 is an end elevation of one end of the handle and its complementary supporting arm showing the attachment;

Figure 4 is a fragmentary detail, partly in section and partly in elevation, to more clearly disclose the manner in which the attachment is positioned in the recessed end of the handle;

Figure 5 is a vertical sectional view taken approximately on the line 5—5 of Figure 3;

Figure 6 is a transverse section taken approximately on the line 6—6 of Figure 3;

Figure 7 is a detail perspective view of the attachment per se;

Figure 8 is a perspective view of the blank from which the attachment is formed; and Figure 9 is a modification of one of the supporting arms showing same formed with laterally extending reinforcing flanges.

In the drawing, the numeral 1 designates the body of the sadiron and secured on the top thereof in the conventional manner is the substantially U-shaped bracket designated generally by the numeral 2, the upper end portions of the arms denoted by the numeral 3 and the securing means for the bracket by the numeral 4.

The wooden handle that is supported between the upper ends of the arms 3 of the bracket is denoted by the numeral 5 and the ends of the wooden handle are recessed as at 6, the recesses extending upwardly from the bottom of the handle as clearly illustrated in the drawing.

The upper ends of the supporting arms 3 are adapted to be disposed in the respective recesses 6 and a screw 7 extends through an aperture formed in the upper end portion of each supporting arm and is driven into the adjacent end of the wooden handle for removably securing the handle in place between the supporting arms in the conventional manner.

The attachment forming a salient part of the present invention is denoted generally by the numeral 8 in Figure 7 and the same is formed from a single piece of sheet metal and is cut out intermediate its ends at both longitudinal edges as at 9. The strip of metal is bent back upon itself to provide inner and outer leg portions 10 and 11, respectively. The leg 11 is longer than the complementary inner leg 10 and the lower free end portion 12 of the longer or outer leg 11 is adapted to be bent back over the lower edge portion of the shorter inner leg 10 to interlock the leg portions in the manner as clearly disclosed in Figures 5 and 7 of the drawing.

Laterally extending flanges 13 are formed along the side edges of the leg 10 and similar laterally extending flanges 14 are associated with the side edges of the outer leg 11 and the purpose of these laterally disposed flanges will be presently described.

The legs are further formed with openings 15 and 16 respectively arranged so that when these legs are in their folded relation, the openings 15 and 16 will be in alignment with one another and provide a means for accommodating the fastening screw 7 which connects each end of the wooden handle with its complementary supporting arm 3.

Upon referring to Figure 7, it will be observed that the flanges 13 and 14 are disposed laterally in opposite directions and further that the upper end portions of the insert or attachment are slightly rounded to coincide with the shape of the recess 6 in each end of the wooden handle.

The attachment is adapted to be disposed in each recess and fits between the bottom face of the recess and the inner face of the complementary supporting arm of the bracket 2. The laterally extending flanges 14 are adapted to embrace the side edges of the upper end portion of the supporting arm 3 and the oppositely disposed laterally extending flanges 13 are embedded in the complementary end of the wooden handle 5 in the manner as clearly disclosed in the drawing.

When the attachment is in place, it is for the most part concealed from view and will not only reinforce the ends of the wooden handle but will also prevent any turning movement thereof, thus protecting the recessed ends of the handle from becoming broken off.

In Figure 9 of the drawing, I have shown a modification wherein, in lieu of the separate attachment, the upper end 17 of each supporting arm of the U-shaped bracket may be formed with integral laterally extending flanges 18 at the side edges thereof and which flanges are adapted to be forced into the ends of the wooden handle for accomplishing the same object for which the separate attachment or insert has been conceived.

An attachment of this character may not only be used upon sadiron handles but also upon implements of various kinds and the same will at all times be positive and efficient in carrying out the purposes for which it is designed.

Having thus described my invention, what I claim is:

1. In combination with a pair of spaced supporting arms, and a handle removably secured therebetween, the ends of the handle being recessed to receive the upper ends of said supporting arms; means arranged in said recesses for engagement with the side edges of the supporting arms and being embedded in the respective ends of the handle for reinforcing said handle and preventing turning movement of the handle.

2. In combination with a pair of spaced supporting arms, and a wooden handle having recessed ends to receive the ends of the supporting arms, fastening elements extending through the supporting arms and into the ends of the wooden handle; metal inserts removably mounted on the fastening elements for disposition in the respective recesses, said inserts including projecting reinforcing means for engagement with the side edges of the supporting arms and the adjacent ends of the wooden handle.

3. In combination with a pair of spaced supporting arms, and a wooden handle having recessed ends to receive the ends of the supporting arms, fastening elements extending through the supporting arms and into the ends of the wooden handle; metal inserts removably mounted on the fastening elements for disposition in the respective recesses, and pairs of flanges extending laterally in opposite directions from each side of each insert, one of said pairs of flanges engaging the side edges of the supporting arm, the other of said pairs of flanges being embedded in the adjacent end of the wooden handle.

4. An attachment for reinforcing sadiron handles comprising an insert for disposition between the end of the handle and the supporting arm therefor, said insert being formed of a strip of metal extending upon itself intermediate its ends to form inner and outer leg portions and oppositely extending flanges formed on the side edges of the legs, the flanges on the outer leg being adapted to embrace the side edges of the handle supporting arm and the flanges on the inner leg adapted to be embedded in the handle.

5. An attachment for reinforcing sadiron handles comprising an insert for disposition between the end of the handle and the supporting arm therefor, said insert being formed of a strip of metal extending upon itself intermediate its ends to form inner and outer leg portions and oppositely extending flanges formed on the side edges of the legs, the flanges on the outer leg being adapted to embrace the side edges of the handle supporting arm and the flanges on the inner leg adapted to be embedded in the handle, said leg portions being formed with registering openings to accommodate the handle securing means that extends through the handle supporting arm.

6. In combination with a pair of spaced supporting arms, and a wooden handle having recessed ends to receive the ends of the supporting arms, fastening elements extending through the supporting arms and into the ends of the wooden handle; metal inserts removably mounted on the fastening elements for disposition in the respective recesses, each insert being of a strip of metal extending upon the back of itself intermediate its ends to form inner and outer leg portions, one leg portion being longer than the other and having its free end extending upon the back of the free end of the shorter leg portion, laterally extending flanges formed at the side edges of each leg portion, the flanges on one leg embracing the side edges of the supporting arm, the flanges on the other leg portion adapted to be embedded in the adjacent end of the handle.

7. In combination with a pair of spaced supporting arms, and a wooden handle having recessed ends to receive the ends of the supporting arms, fastening elements extending through the supporting arms and into the ends of the wooden handle; metal inserts removably mounted on the fastening elements for disposition in the respective recesses, each insert being of a strip of metal extending upon the back of itself intermediate its ends to form inner and outer leg portions, one leg portion being longer than the other and having its free end extending upon the back of the free end of the shorter leg portion, laterally extending flanges formed at the side edges of each leg portion, the flanges on one leg embracing the side edges of the supporting arm, the flanges on the other leg portion adapted to be embedded in the adjacent end of the handle, said leg portions being formed with registering openings through which the handle fastening elements extend.

MEYER LASKIN.